United States Patent [19]
Jonsson

[11] Patent Number: 5,583,917
[45] Date of Patent: Dec. 10, 1996

[54] METHOD AND ARRANGEMENT FOR SEMIPERMANENT STORAGE OF A SERVICE PROFILE IN PERSONAL COMMUNICATION SYSTEMS

[75] Inventor: Ulf Jonsson, Svedala, Sweden

[73] Assignee: Telia AB, Farsta, Sweden

[21] Appl. No.: 341,135

[22] Filed: Nov. 16, 1994

[30] Foreign Application Priority Data

Nov. 24, 1993 [SE] Sweden .................................. 9303880

[51] Int. Cl.$^6$ .............................. H04M 3/42; H04M 3/50
[52] U.S. Cl. .................................................. 379/60; 379/59
[58] Field of Search .................................. 379/58, 59, 60, 379/61, 62, 63; 455/33.1, 33.2

[56] References Cited

U.S. PATENT DOCUMENTS 5,123,111  5/1992  Delory et al. ........................ 379/60 X

OTHER PUBLICATIONS

Proposal Strawman for Automatic Roaming Electronic Industries Association TR–45.2 Cellular System Operation Jun. 18, 1985 (pp. 9–10).

*Primary Examiner*—Curtis Kuntz
*Assistant Examiner*—Lisa M. Coward
*Attorney, Agent, or Firm*—Oblon, Spivak, McClelland, Maier & Neustadt, P.C.

[57] ABSTRACT

A method and an arrangement for semipermanent storage of a service profile in personal communication systems. A service profile which defines the services accessible to the user is tied to each user in the system. The service profiles are stored permanently in the home database of the respective user. To reduce signalling in the network, parts of the permanent service profiles are copied in order to be stored semipermanently in other databases according to the disclosed method. Enquiries relating to an answering user are tracked by the database unit in the home network part of the answering user in order to detect the geographic position of the network nodes which originate the enquiries and the respective enquiry intensity. Information from the service profile of a respective answering subscriber is copied and sent to the database unit which is located closest to the enquiring node when the enquiry intensity has reached a certain value from one and the same node.

9 Claims, 2 Drawing Sheets

METHOD AND ARRANGEMENT FOR SEMIPERMANENT STORAGE OF A SERVICE PROFILE IN PERSONAL COMMUNICATION SYSTEMS

FIELD OF THE INVENTION

The present invention relates to a method and an arrangement for semipermanent storage of a service profile in personal communication systems. When mobility is introduced into telecommunication networks, communication systems arise where the subscription is tied to persons instead of fixed subscriber sets. This produces so-called personal communication systems. Each subscription then requires a service profile which defines which services the subscriber has access to. The present invention relates to storage of these service profiles and produces a reduction of signal paths, shorter connection times and therefore better performance for the personal communication system.

PRIOR ART

Naturally, service profiles must be stored even in today's mobile communication systems. In GSM, for example, service profiles are used which are permanently stored in a so-called home location register (HLR). In a call to a GSM subscriber, a request is sent to the HLR which responds with the current network address. The call is then connected. To reduce the amount of long-distance signalling, which therefore requires network resources and time, a local temporary visited location register (VLR) has also been introduced in the GSM. When a GSM subscriber registers with a network address outside his home network, parts of the service profile are copied from the HLR to the VLR.

With a continued development of subscriber congestion in mobile telephone systems as has happened in recent years, the signalling networks which are loaded relatively lightly today, will reach their capacity ceiling within a few years. There is therefore a need for more effective storage of service profiles and signalling in the network. The present invention meets this need.

SUMMARY OF THE INVENTION

The present invention thus provides a method for semipermanent storage of service profiles in personal communication systems which comprise a network composed of logically different network parts, from the point of view of a user, namely a calling network part, an answering network part, a calling user's home network part, an answering user's home network part and possible intermediate network parts. The network parts each comprise functions for service and network control, among others units for controlling the services and database units for storing data. The data includes service profiles of the users.

According to the invention, enquiries relating to an answering user are registered by the database unit in the answering user's home network part in order to detect the geographic position for the network nodes or networks which originate the enquiries and respective enquiry intensity. Information from the service profile of the respective answering subscriber is copied and transmitted to the database storage unit which is located closest to the enquiring node or network when the enquiry intensity has reached a certain value from one and the same node or network. This data storage unit then semipermanently stores the service profile information in question and thus functions as a semipermanent database for this service profile information.

The present invention also relates to an arrangement for carrying out the method. Further embodiments of the invention are specified in greater detail in subsequent claims.

BRIEF DESCRIPTION OF DRAWINGS

The invention will now be described with reference to attached drawings, in which.

DETAILED DESCRIPTION OF PREFERRED EMBODIMENTS

Figure 1:
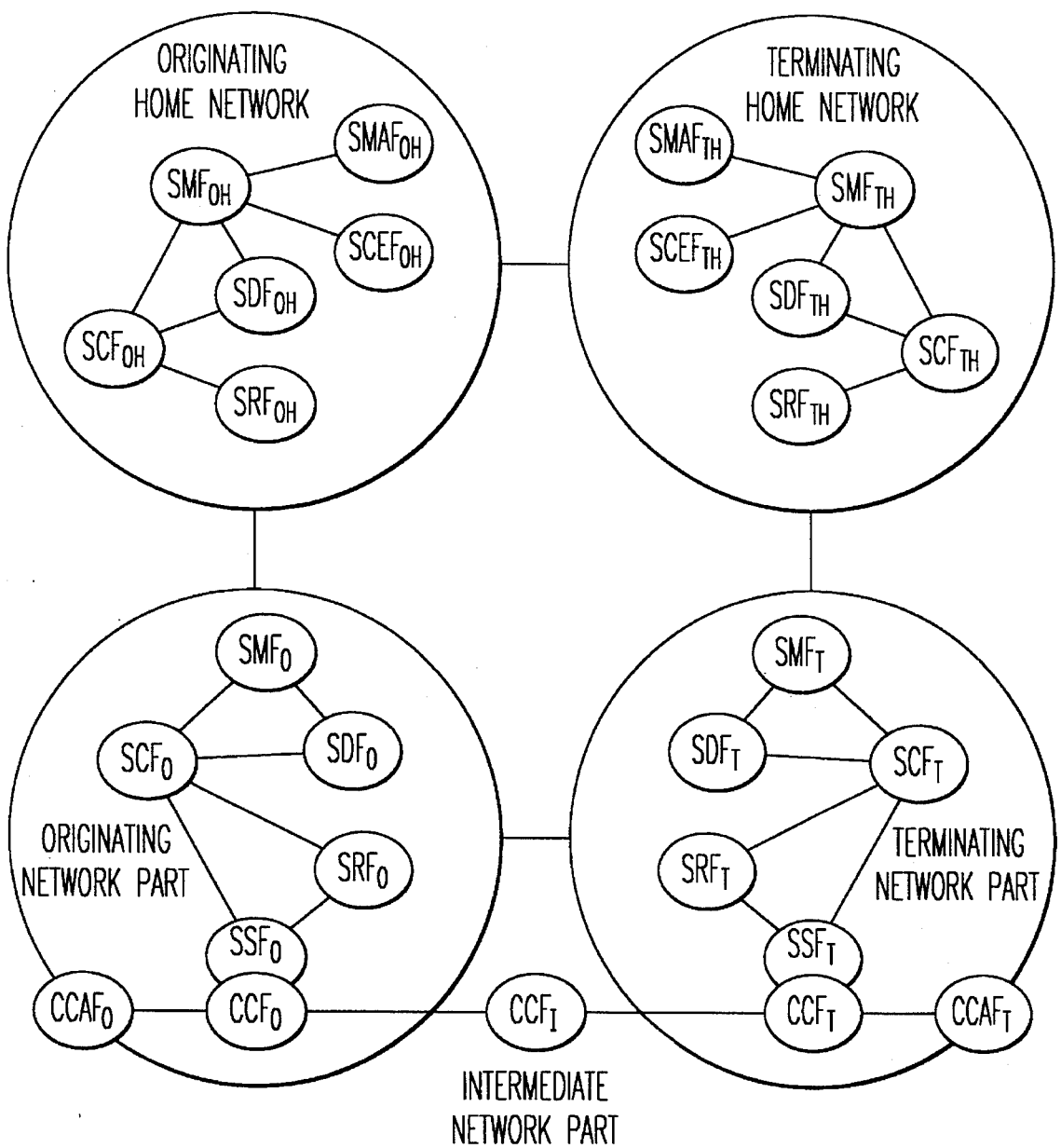
FIG. 1 is a block diagram of the function architecture according to the present invention.

Mobility is introduced to an ever greater extent in telecommunication networks. Mobile telephone networks are naturally pioneers but many services are provided with mobility even in the fixed networks. Forwarding and portability are trivial examples of this. A personal number and account call are other, more advanced examples. Thus, gradually, all communication over networks will probably take up some form of mobility.

Coupled with mobility but to a greater extent with general customer handling, the account concept is introduced in connection with telecommunication. Today, every customer is identified by a telephone number, a physical connection point in the network. In future, customers will have their own account instead, to which a certain service offer is coupled and which is charged with the costs for the utilization of services. The service offer which is coupled to a certain account is called a service profile. When a customer wishes to open a subscription, an account is activated and a service profile is set up. The customer determines which services will be included in the profile. The profile also contains other information about the customer, for example debiting information and status information which is of greater interest in connection with the present invention.

An example of status information is locating information, that is to say where the customer happens to be located at the time, or more correctly, where the customer has last registered. Where mobility is introduced into the service offer, the network must know where calls to a certain customer will be connected to (where the call will be directed). This is carried out by a customer who wishes to be accessible registering with a suitable fixed telephone or mobile or cordless telephone. This information is thus stored in the service profile.

For the present, the service profiles in the GSM are stored with the aid of HLR/VLR technique as mentioned above. This technique is general and well-suited to all types of mobility in all networks. However, a pre-requisite both for GSM and for all other mobile telephone systems of today is that the number of subscribers is relatively limited, in any case compared with the number of fixed subscribers. The distribution of databases which is specified for GSM entails a greatly increased loading of the signalling network. Calculations show that with continued development of subscriber congestion in mobile telephone systems as has happened in recent years, the signalling networks, which are loaded relatively lightly today, will reach their capacity ceiling within a few years. An increased mobility in networks, fixed as well as mobile, thus produces a steeply increased signalling loading.

Nor will the majority of all users be extremely mobile in future but will move within a region or a country. Similarly, most of the calls are local, that is to say calling and called parties are located within the same or a nearby database area. The signalling traffic for these will therefore be limited. But users who are mobile over networks, countries and continents will increase as the international traffic is increasing today. With the introduction of personal communication, the account, service profiles in databases and mobility as a basic component in all telecommunication services, this traffic will require that the demand for signalling per subscriber is greatly reduced compared with what is required with the HLR/VLR technique of today. The present invention constitutes a further development of this technique for adaptation to the new and increased demands entailed by mass mobility. The invention involves an addition to the HLR/VLR principle of today for reducing long-distance resource-demanding signalling for routing information for mobile customers.

One function in the home database or alternatively its control unit tracks the network nodes or networks from which the enquiries are made. When a certain number of enquiries has been made or when the intensity has reached a certain value, from one and the same node/network, a copy of suitable parts of the profile is automatically copied to the database which is closest to the enquiring node/network. This then becomes a semipermanent database with respect to the copied service profile information. The entire profile does not need to be and should not be copied, only primary routing information and possibly other relevant status information.

All enquiries are first sent to the local database before the home database of the required subscriber is contacted. If a copy of the service profile of the required subscriber is found stored in this local database, the home database does not need to be contacted. This prevents unnecessary signalling and the connection time for the call can be reduced.

When the status of a subscriber is changed, for example through a new registration, the home database is updated. The database or bases which contain the semipermanent service profile information must also be updated which is done by the home database or its control unit. To avoid that this signalling becomes too extensive, the threshold for the number of enquiries or enquiry intensity must be set at the right level. Alternatively, the maximum number of semipermanently stored items of service information can be limited.

By also introducing hierarchical database structures which implies that the copy from the service profile information is stored in the lowest database to which higher databases contain pointers, a progressively widening locating range or control range is obtained. By this means, lesser movements of subscribers do not entail the service profile in the home database or the semipermanent databases having to be updated. For the relatively stationary subscribers, this addition does not imply any change; most of the routing enquiries occur locally and the subscriber is located within the locating range of the home database. For subscribers who carry out the greater proportion of their traffic from a certain area, the local database of this area will operate in practice as home database. One example is subscribers who permanently or temporarily move to another corner of the country or to another country. The system is self-regulating to a certain extent and adapts itself dynamically to the traffic profile of each subscriber.

EXAMPLE

In the following example, the present invention is described in an architecture based on an intelligent network (IN) with INAP protocol (intelligent network application part). Naturally, the invention can be used equally well in other protocols, for example MAP (mobile application part) or X.500.

Personal communication systems (PCS) offer personal mobility and advanced customer handling. Due to the mobility of the user, five logically different network parts can be identified: the originating network part (O), the terminating network part (T), the intermediate network part, the originating home network part (OH) and the terminating home network part (TH), see FIG. 1. These network parts contain functions for service and network control and for management. In a PCS call, each part knows a home, a PCS subscriber operator. This manages its subscribers and controls and offers them the PCS services. The network in which the connection is initiated and the network in which the connection is terminated are controlled by different network operators. One or more intermediate networks can switch the calling and answering networks together.

The system offers personal mobility, that is to say the user can receive and initiate calls and be personally debited at any access point in any network which has an agreement with the subscriber operator of the PCS user. The user also has access to all his PCS services which are supported by the network and the terminal. This personal mobility requires that all different domains, networks and "homes", which are included in the call have automatic locating control. This implies that they can identify, offer services to and debit a calling PCS user and locate and route calls to a called PCS user.

The locating control is controlled by the IN functions in the different domains in cooperation. All information about a particular user is stored in a service profile. The main service profile is stored in a database at the subscriber operator's of the PCS user, that is to say in the home network. Relevant information in the service profile is copied also to local databases in the visited, calling or answering, networks. This is done to obtain optimum network resource use, that is to say efficient signalling and call routing.

In FIG. 1, the distributed function architecture according to the present invention is shown. From the point of view of mobility, the most important units are:

service control functions $SCF_{OH/TH}$, $SCF_{O/T}$, which control the services and the users who use the services and networks which support the services;

service data functions $SDF_{OH/TH}$, $SDF_{O/T}$ which store data related to services, users and networks, for real-time access to associated SCFs when a service provided by the PCS is performed. $SDF_{OH/TH}$ are the units where the user data is stored permanently, in other words the main service profile, whilst $SDF_{O/T}$ temporarily stores the service profiles for users who are registered in the visited area for this SDF. The service profiles can also be stored semipermanently in either $SDF_{OH/TH}$ or $SDF_{O/T}$;

service management functions $SMF_{OH/TH}$, $SMF_{O/T}$ which manage the services, users and respective networks.

The most important aspect of the invention is the technique for storing service profiles in distributed database architectures. This presupposes that a main service profile is always stored in the home database SDF of a user. The technique for distributing information from the service profile is that the service profile is copied to the nearest service database SDF in the visited network part on registration and that the service profile is copied dynamically to a semipermanent database SDF at the origin of service profile enquiries with high intensity.

The first part of the technique is used in most cellular networks today, for example GSM. Subscriber information is permanently stored in HLRs and temporarily in the VLR of the visited network part. This is a simple technique which entails a compromise between signalling for updating of databases and signalling on connection of calls.

The present invention relates to the second part of the technique, namely development of the HLR/VLR technique. The service profile of a PCS user is copied to the visited database SDF on registration. A call to this user triggers an enquiry to the home database $SDF_{TH}$ of the answering user and routing information and the call are routed to the visited answering network part. A high intensity of enquiries to a user from a special calling network part, however, results in the service profile of this user being copied to the database $SDF_O$ of the affected caller. As a result, subsequent outing calls will not trigger any enquiry to $SDF_{TH}$ but only a local enquiry about service profile information in $SDF_O$. This database $SDF_O$ then becomes a semipermanent SDF with respect to the copied service profile information, which provides a more dynamic compromise between signalling for updating of databases and signalling on connection of calls in order to optimize the network's signalling and routing. A disadvantage in this technique could be that all updating of the service profile in the home database SDF would require updating of all semipermanent databases SDF which increases the signalling between databases. To remedy this problem, the present invention specifies that the number of allowed semipermanent databases SDF is maximized and/or the threshold value is adjusted in order to form semipermanent databases.

In the text below, the effect of the selected distribution technique on the interaction between the databases with respect to FIG. 2 and 3 relating to registration of respective incoming calls is described. It is assumed that the different control units SCF control all external network signalling, that is to say all communication between home networks and second networks is handled by SCF-SCF signalling which is described in the figures. Another possibility is that SCF-SCF signalling is also possible between different network parts and finally direct SDF-SDF signalling. Information flow which does not directly affect the interaction between the databases for updating service profiles and copying, for example return signalling, identification and authorization control and so forth is not described in the example.

Figure 2:
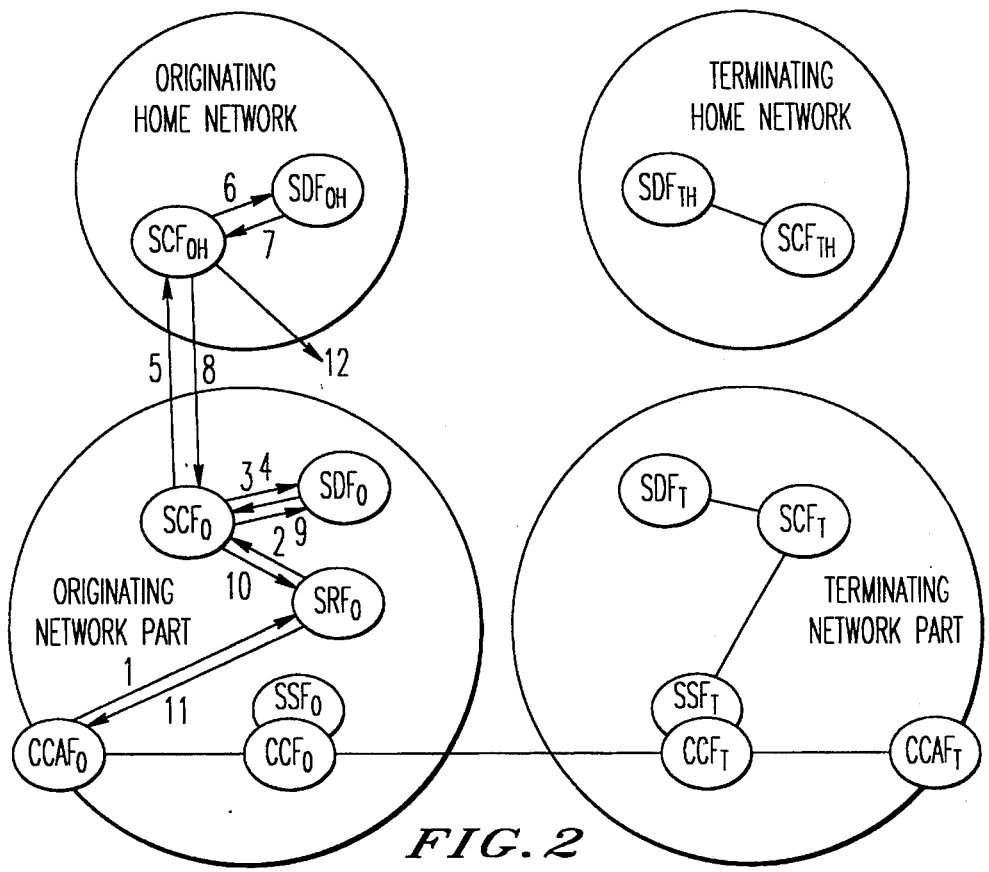
FIG. 2 is a flow chart of the function sequence on registering.

FIG. 2 thus describes the interaction between the function units on registration. On detection of a registration request from a PCS user via $SRF_O$ 1-2, $SCF_O$ checks if the service profile is stored in the local database $SDF_O$ 3. If this SDF does not have the requested service profile 4, $SCF_O$ asks $SCF_{OH}$ 5. This enquiry causes $SCF_{OH}$ to fetch the service profile from the database $SDF_{OH}$ 6 and the reply 7 is sent back to $SCF_O$ 8 which updates $SDF_O$ 9. The request is acknowledged to the user 10–11. If semipermanent databases SDF are active, these are updated by $SCF_{OH}$ 12.

Figure 3:
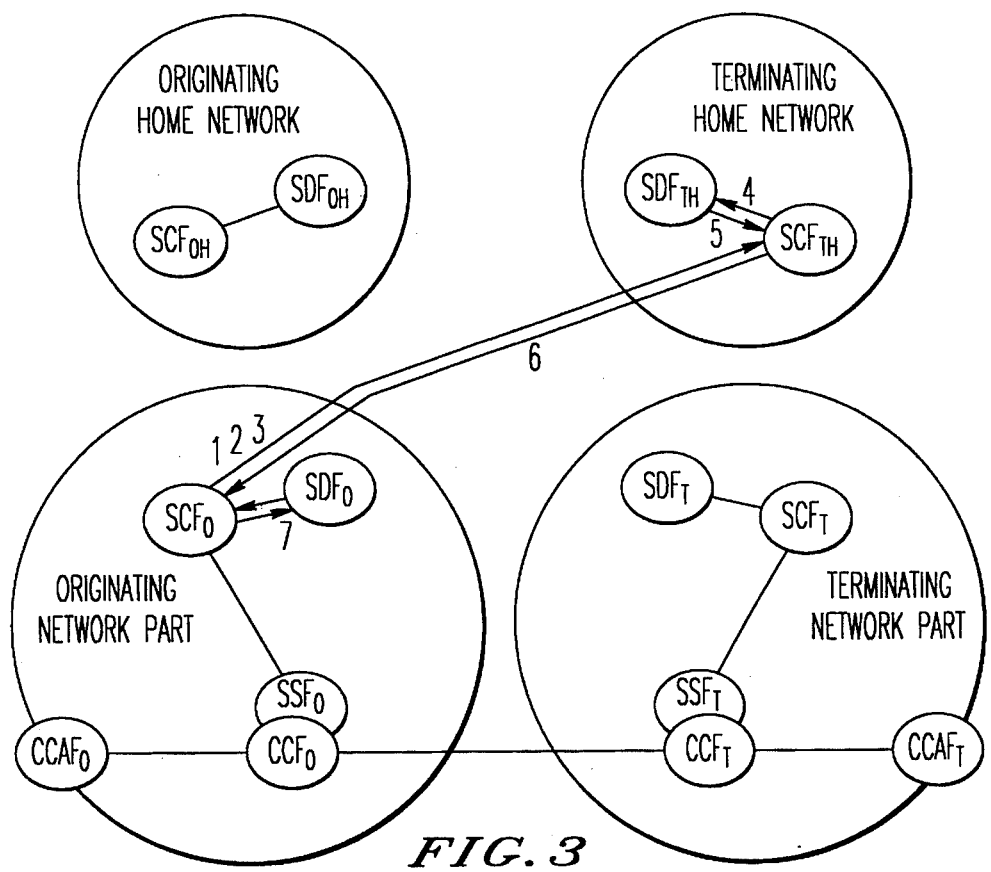
FIG. 3 is a flow chart of the function sequence with an incoming call.

FIG. 3 shows the interaction between function elements and databases with incoming calls. On detection of a connection request to a PCS user, the calling control unit $SCF_O$ requests information from the calling database $SDF_O$ 1. If this SDF is a semipermanent SDF for the called user, it replies with the requested information 2. If this is not so, that is to say the reply 2 is negative, the control unit $SDF_O$ sends the enquiry to the control unit in the called party's home network part $SCF_{TH}$ 3. This enquiry causes $SCF_{TH}$ to fetch information from the database in the home network part $SDF_{TH}$ 4 which replies 5, and this reply is sent back to $SCF_O$ 6. The call is connected on the basis of this information. If the service profile enquiries from this $SCF_O$ have a high intensity, $SDF_O$ becomes a semipermanent database SDF 7.

In the network architectures described, the service profile distribution according to the present invention thus increases the performance of the system, reduces long signal paths and thus results in shorter connection times. Naturally, the invention can be implemented in many similar ways. The scope of the invention is only limited by the patent claims below.

We claim:

1. Method for storage of a portion of a service profile in personal communication systems which include a network composed of logically different network parts, from the point of view of a calling user, including an originating network part (O), a terminating network part (T), an originating home network part (OH), and a terminating home network part (TH), all of the network parts include functions for service and network control including units for control of the services (SCF) and database units for storing data (SDF), the stored data including service profiles of users, the method comprising the steps of:

sending an enquiry about a portion of the service profile of an answering user to at least one of first and second databases, tracking enquiries relating to the answering user by using the first database unit ($SDF_{TH}$) in the home network part of the answering user in order to detect a geographic position of network nodes or networks which originate the enquiries, tracking respective enquiry intensity, copying and transmitting the portion of the service profile of the answering user to the second database unit ($SDF_O$) which is located closest to the enquiring node or network, and storing the portion of the service profile of the answering user in the second database unit ($SDF_O$) when the enquiry intensity has reached a certain value from a single node or network.

2. Method according to claim 1, wherein the step of copying and transmitting comprises the steps of copying and transmitting routing information and status information from the service profile of the answering user to the second database unit ($SDF_O$).

3. Method according to claim 1, wherein the step of sending an enquiry comprises the steps of:

sending all enquiries about the answering user first to the second database unit ($SDF_O$) of the calling user, and bypassing sending an enquiry to the first database unit ($SDF_{TH}$) of the answering user if the service profile information of the answering user is stored in the second database unit ($SDF_O$).

4. Method according to claim 2, further comprising the steps of:

updating an answering user service profile in the first database unit of the answering user with a change in status, and updating, using the service control unit associated with the first database unit of the answering unit, the answering user service profile in the second database unit.

5. Method according to claim 1, wherein the step of tracking the respective enquiry intensity comprises tracking the enquiry intensity as a number of enquiries, and wherein the step of storing comprises storing the portion of the service profile of the answering user when a number of enquiries reaches a predetermined value.

6. Method according to claim 1, wherein the step of storing comprises storing up to a maximum number of respective portions of service profiles of respective answering users.

7. Arrangement for storage of a service profile in personal communication systems which include a network composed of network parts which are logically different from a point of view of a calling user, including an originating network part (O), a terminating network part (T), an originating home network part (OH), and a terminating home network part (TH), each of the network parts comprising:

a function unit for providing services, a network control means including units (SCF) for controlling the services, and a database unit (SDF) for storing data including service profiles of users and information about enquiries relating to answering users, the information including a geographic position of a calling network node or network and respective enquiry intensity, the database units (SDF) including means for sending a portion of respective service profiles to other databases, means for receiving copies of respective portions of service profiles from the other databases about answering users and means for storing the respective received portions of service profiles about answering users.

8. Arrangement according to claim 7, wherein respective service control units (SCF) comprise:

means for detecting a change in a corresponding database unit, and means for sending updated information to a database unit storing an old copy of the updated information.

9. Arrangement according to claim 7 or 8, wherein the means for storing the respective received portions of service profiles comprises means for storing up to a maximum number of respective received portions of service profiles.

* * * * *